June 13, 1961  R. M. KILTZ  2,988,672
SWITCHING APPARATUS
Filed April 30, 1958
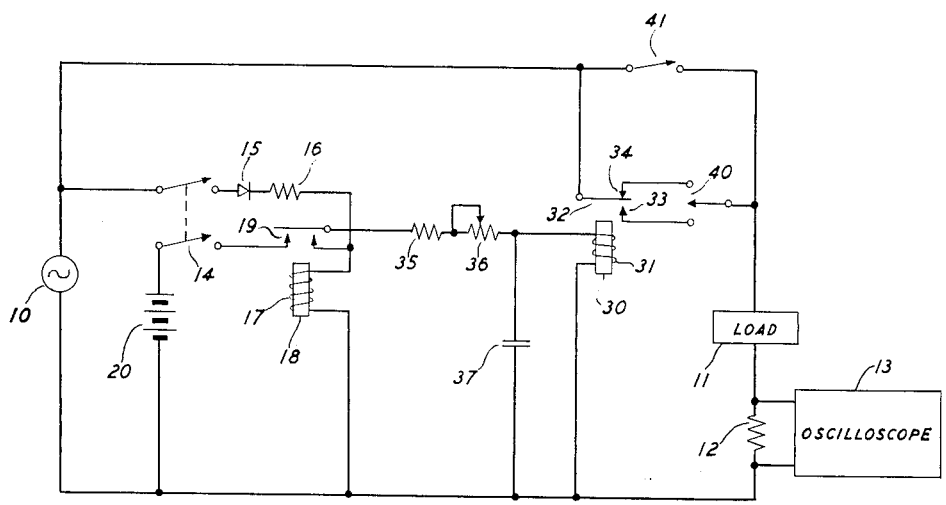
INVENTOR
R. M. KILTZ
BY
*G. F. Heuerman*
ATTORNEY United States Patent Office 2,988,672
Patented June 13, 1961

2,988,672
SWITCHING APPARATUS
Richard M. Kiltz, Belleville, N.J., assignor to Bell Telephone Laboratories, Incorporated, New York, N.Y., a corporation of New York
Filed Apr. 30, 1958, Ser. No. 731,904
3 Claims. (Cl. 317—9)

This invention relates to switching apparatus and more particularly to switching apparatus for opening or closing a circuit for supplying alternating current to a load at a desired time relative to the phase of the alternating wave.

An object of the invention is to provide improved switching means for opening or closing an alternating current supply circuit at a desired phase angle of the alternating wave.

Another object is to provide improved switching means for opening or closing a circuit for energizing a load from an alternating current supply source at an instant such that the transient current or voltage supplied to the load has a desired amplitude.

This invention is an improvement over the invention disclosed in an application of E. A. Berkery and I. E. Carlen, Serial No. 731,899, filed April 30, 1958.

The switching circuit is of use, for example, in determining or measuring the maximum current supplied to a load or the maximum voltage set up across the load when the load is connected to or disconnected from a source of alternating current. The load may be any electrical apparatus or circuit to which alternating current or voltage is to be supplied, such as circuits comprising rectifiers, lamps, circuit breakers or fuses, for example. The need for accurately measuring current and voltage transients is very important in designing circuits using diodes or transistors, for example, since such circuit elements are easily damaged due to momentary overloads of voltage or current. In addition to its use for measuring transient currents and voltages, the switching apparatus may also be used for opening or closing a circuit comprising a load and a source of alternating current at an instant when the alternating voltage or current has a predetermined phase angle such that the transient component of the voltage or current is reduced in amplitude or substantially eliminated.

When a load having a highly inductive impedance is connected to or disconnected from an alternating current supply source, a high amplitude transient current will flow in the load circuit if it is closed or opened at a substantially zero or 180 degree phase angle of the alternating voltage wave, for example, that is, at an instant when the voltage of the supply source is zero. If, on the other hand, this inductive circuit is opened or closed at a phase angle of substantially 90 degrees or 270 degrees of the alternating voltage wave, that is, at an instant when the voltage has a maximum amplitude, the current in the circuit will have substantially no transient component. In the case of a highly capacitive load, a high amplitude transient will be produced if the load circuit is opened or closed at a phase angle of 90 degrees or 270 degrees of the alternating voltage wave and there will be produced substantially no transient component if the circuit is opened or closed at a phase angle of zero or 180 degrees of the alternating voltage wave. The amplitude of the transient current in the circuit will depend not only on the phase angle of the alternating voltage wave at the instant that the load circuit is closed or opened but also on the phase angle of the load, that is, the angle whose tangent is the ratio of the load reactance to the load resistance. It will be assumed herein, unless otherwise specified, that the alternating voltage of the supply source is a substantially sine wave having zero amplitude at phase angles of zero, 180 degrees, and 360 degrees in any cycle of the wave and having a maximum amplitude of positive polarity at 90 degrees and a maximum amplitude of negative polarity at 270 degrees in any cycle.

In a specific embodiment of the invention, herein shown and described for the purpose of illustration, there is provided a first electromagnetic relay or switch which is operated in response to current of a predetermined polarity only, positive polarity, for example, supplied from an alternating current supply source to a circuit including the relay winding. Operation of the first relay completes circuits for supplying current from a direct current source to the winding of the first relay for maintaining it operated and to the winding of a second electromagnetic relay or switch for causing it to operate. An adjustable delay circuit is provided for the second relay to delay its operation for an interval of desired duration following the operation of the first relay. Operation of the second relay opens or closes a circuit for supplying current from the alternating current supply source to the load.

The invention will now be described in greater detail with reference to the accompanying drawing, the single figure of which is a schematic view of a switching circuit embodying the invention.

Referring now to the drawing, there is provided a relatively inexpensive switching apparatus adapted for opening or closing a circuit for supplying current from an alternating current supply source 10 to a load 11 at a desired phase angle of the voltage of the source 10. For the purpose of producing a visual indication of the current supplied to the load circuit, there are provided a resistor 12 of low resistance value in series with the load and an oscilloscope 13 having a pair of terminals connected across the resistor 12.

The operation of the switching circuit is started by closing a double pole, single throw switch 14, thereby completing a circuit comprising the alternating current source 10, switch 14, a rectifying element 15, a resistor 16 and the winding 17 of a first electromagnetic relay or switch 18, all in a series. Sufficient current for causing relay 18 to operate will flow through the circuit comprising relay winding 17 and rectifying element 15 during a half cycle period of predetermined polarity of the alternating voltage wave from the source 10, positive polarity, for example. Closure of the contacts 19 of relay 18, when the relay operates, causes the completion of a circuit comprising a battery 20, switch 14, relay contacts 19 and relay winding 17, all in series, thereby maintaining the relay 18 operated.

There is provided a second electromagnetic switch or relay 30 having a winding 31, an armature 32 and contacts 33 and 34. With switch 14 closed and relay 18 operated, there is completed a circuit comprising battery 20, a resistor 35, a rheostat 36 and the winding 31 of relay 30, all in series, a condenser 37 being connected across the relay winding 31. Resistor 35, rheostat 36 and condenser 37 form a delay network for delaying the supply to relay winding 31 of sufficient current for causing the relay to operate. The resistance of rheostat 36 may be varied for adjusting the delay interval separating the time of operation of relay 18 and the time of operation of relay 30. There is provided a single pole double throw switch 40 for connecting relay contact 33 or relay contact 34 to the upper terminal of load 11, as viewed in the drawing. The armature 32 of relay 30 is connected to the upper terminal of the alternating current supply source 10, as viewed in the drawing. A switch 41 is provided for connecting the upper terminal of the alternating current source 10 to the upper terminal of the load 11.

To understand the operation of the switching system, assume first that switches 14 and 41 are open and that switch 40 is closed to the lower position, as viewed in the drawing, so as to connect contact 33 to the upper load terminal. Closure of switch 14 will then cause relay 18 to operate during a positive half cycle period of the alternating voltage of the supply source 10. The operation of relay 18 will cause direct current from battery 20 to be supplied to the circuit comprising the delay network 35, 36, 37 and the winding 31 of relay 30. As a result, relay 30 will operate to complete the circuit for supplying current from the supply source 10 to the load 11 at an instant determined by the setting of rheostat 36 of the delay network. Assuming that the voltage of the source 10 and the circuit constants are such that the relay 18 operates when the voltage of the source 10 is at a maximum positive value, for example, that is, at a phase angle of 90 degrees, then the rheostat 36 may be adjusted to introduce a delay of 90 degrees or 270 degrees, for example, so that the relay 30 will operate to close the load circuit through armature 32 and contact 33 at an instant when the phase of the alternating voltage wave is 180 degrees or 360 degrees. Of course, the rheostat may be adjusted to introduce any desired interval between the time of operation of relay 18 and the time of operation of relay 30 so that the load energizing circuit will be closed when the phase angle of the alternating voltage wave has any desired value.

After the completion of the circuit for supplying alternating current to the load, as described above, switch 41 may be closed to connect the load 11 to the supply source 10 independently of the contacts of relay 30 and the switch 40. Switch 40 may then be closed to its upper position to connect contact 34 to the upper load terminal and switch 14 may be opened to cause relays 18 and 30 to release. The load circuit will then be completed through armature 32 and contact 34 of relay 30 and switch 40. Switch 41 may then be opened to condition the switching circuit for disconnecting the load from the supply source 10 at an instant when the phase angle of the alternating voltage wave has a desired value. To accomplish this, switch 14 is again closed to cause relay 18 to operate at a predetermined phase angle of the alternating voltage wave, 90 degrees, for example, and to cause relay 30 to operate after a selected delay interval measured from the time of operation of relay 18, this delay interval being adjustable by means of the rheostat 36. If the delay network 35, 36, 37 is adjusted to effect a delay of 90 degrees or 270 degrees, for example, then relay 30 will operate to disconnect the load 11 from the supply source 10 when the phase angle of the alternating voltage wave is 180 degrees or 360 degrees, that is, when the instantaneous voltage of the supply source 10 is zero. Of course, the rheostat 36 may be adjusted so as to cause the interruption of the load circuit at some other desired phase angle of the alternating voltage wave.

What is claimed is:

1. In combination, a first and a second electromagnetic switch, means for transmitting current from an alternating-current supply source to a load through a circuit including contacts of said second switch when closed, means responsive to current of one polarity only of said supply source for causing the operation of said first switch, a source of direct current, means responsive to the operation of said first switch for supplying energizing current from said direct-current source to said first switch for maintaining it operated, and means responsive to the operation of said first switch for causing the operation of said second switch, said means comprising means for supplying current from said direct-current source to said second switch and means for controlling the rate of increase of current supplied to said second switch to delay its operation.

2. In combination, a first and a second electromagnetic relay, means for rectifying current from an alternating-current supply source and for supplying said rectified current to said first relay for causing it to operate when said rectified current reaches a predetermined amplitude, an adjustable delay network, a direct-current source, means responsive to the operation of said first relay for supplying current from said direct-current source to said first relay for maintaining it operated, means responsive to the operation of said first relay for supplying current from said direct-current source through said delay network to said second relay to cause it to operate, means for supplying current from said alternating-current supply source to a load through a contact of said second relay when said contact is closed and means responsive to the operation of said second relay for opening or closing said contact.

3. In combination, a first relay having a first winding and a first contact, a second relay having a second winding and a second contact, a switch, a rectifying element, a first circuit for supplying operating current to said first winding of said first relay comprising an alternating-current supply source, said switch, said rectifying element and said first winding all in series, a second circuit which is completed in response to the operation of said first relay comprising a direct-current source, said switch, said first contact and said first winding all in series, the current in said second circuit maintaining said first relay operated, variable resistance means, a condenser, a third circuit for supplying operating current to said second winding of said second relay comprising said direct-current source, said switch, said first contact, said variable resistance means and said second winding all in series, said condenser being connected across said second winding, and a fourth circuit comprising said alternating-current source, said second contact when closed and a load all in series.

References Cited in the file of this patent

UNITED STATES PATENTS

| | | |
|---|---|---|
| 1,725,022 | Stacy et al. | Aug. 20, 1929 |
| 2,412,092 | Mayle | Dec. 3, 1946 |
| 2,782,345 | Kesselring | Feb. 19, 1957 |
| 2,849,659 | Kesselring | Aug. 26, 1958 |
| 2,859,400 | Kesselring | Nov. 4, 1958 |